US010222865B2

(12) United States Patent
Aurongzeb et al.

(10) Patent No.: US 10,222,865 B2
(45) Date of Patent: Mar. 5, 2019

(54) SYSTEM AND METHOD FOR SELECTING GESTURE CONTROLS BASED ON A LOCATION OF A DEVICE

(71) Applicant: Dell Products, LP, Round Rock, TX (US)

(72) Inventors: Deeder M. Aurongzeb, Austin, TX (US); Erin K. Walline, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 113 days.

(21) Appl. No.: 14/287,644

(22) Filed: May 27, 2014

(65) Prior Publication Data
US 2015/0346823 A1 Dec. 3, 2015

(51) Int. Cl.
*G06F 3/14* (2006.01)
*G06F 3/01* (2006.01)
*G01S 3/00* (2006.01)
*G06K 9/00* (2006.01)
*G01S 11/12* (2006.01)

(52) U.S. Cl.
CPC ............... *G06F 3/017* (2013.01); *G01S 3/00* (2013.01); *G06K 9/00355* (2013.01); *G01S 11/12* (2013.01)

(58) Field of Classification Search
CPC ..................................... G06F 3/14; G06F 3/17
USPC ........ 715/863, 716, 764; 345/156, 158, 175, 345/157; 382/103
See application file for complete search history.

(56) References Cited

U.S. PATENT DOCUMENTS

| 2006/0026535 | A1 | 2/2006 | Hotelling et al. | |
| 2009/0125824 | A1* | 5/2009 | Andrews | G06F 3/03547 715/764 |
| 2010/0031203 | A1 | 2/2010 | Morris et al. | |
| 2012/0092253 | A1* | 4/2012 | Irani | G06F 1/1692 345/157 |
| 2013/0271370 | A1* | 10/2013 | Wang | G06K 9/00389 345/158 |
| 2013/0329946 | A1* | 12/2013 | Archibald | G06K 9/00335 382/103 |

(Continued)

OTHER PUBLICATIONS

"Procedure for Developing Intuitive and Ergonomic Gesture Interfaces for Man-Machine Interaction," Nielsen, Aalborg University, Laboratory of Computer Vision and Media Technology, Denmark, Technical Report CVMT 03-01, ISSN 1601-3646, CVMT, Aalborg University, Mar. 2003, pp. 1-12.

*Primary Examiner* — Ruay Ho
(74) *Attorney, Agent, or Firm* — Prol Intellectual Property Law, PLLC; H. Kenneth Prol (57) ABSTRACT

An information handling system a memory, a camera, an image analysis module, and an action module. The memory is configured to store a mapping of a plurality gestures to a plurality of operations to be performed in the information handling system. The camera is configured to detect a field of view, and to capture a movement made by an individual within the field of view. The image analysis module is configured to receive movement data from the camera, and to determine a gesture associated with the movement based on the field of view. The action module is configured to map the determined gesture to an operation of the information handling system based on the mapping of the plurality of gestures to the plurality of operations stored in the memory.

20 Claims, 6 Drawing Sheets

(56) References Cited

U.S. PATENT DOCUMENTS

| | | | |
|---|---|---|---|
| 2014/0129937 A1* | 5/2014 | Jarvinen | G06F 3/0487 715/716 |
| 2014/0195988 A1* | 7/2014 | Kramer | G06F 3/017 715/863 |
| 2014/0240231 A1* | 8/2014 | Minnen | G06F 3/017 345/158 |
| 2015/0054729 A1* | 2/2015 | Minnen | G06K 9/00375 345/156 |
| 2015/0193088 A1* | 7/2015 | Ding | G06F 3/0425 345/175 |

* cited by examiner

FIG. 6

SYSTEM AND METHOD FOR SELECTING GESTURE CONTROLS BASED ON A LOCATION OF A DEVICE

FIELD OF THE DISCLOSURE

The present disclosure generally relates to selecting gesture controls based on a location of a device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system can integrate gesture commands as a user interface of the information handling system. Thus, an individual can utilize different gestures, such as moving a hand or looking away, to cause the information handling system to perform different functions or operations.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
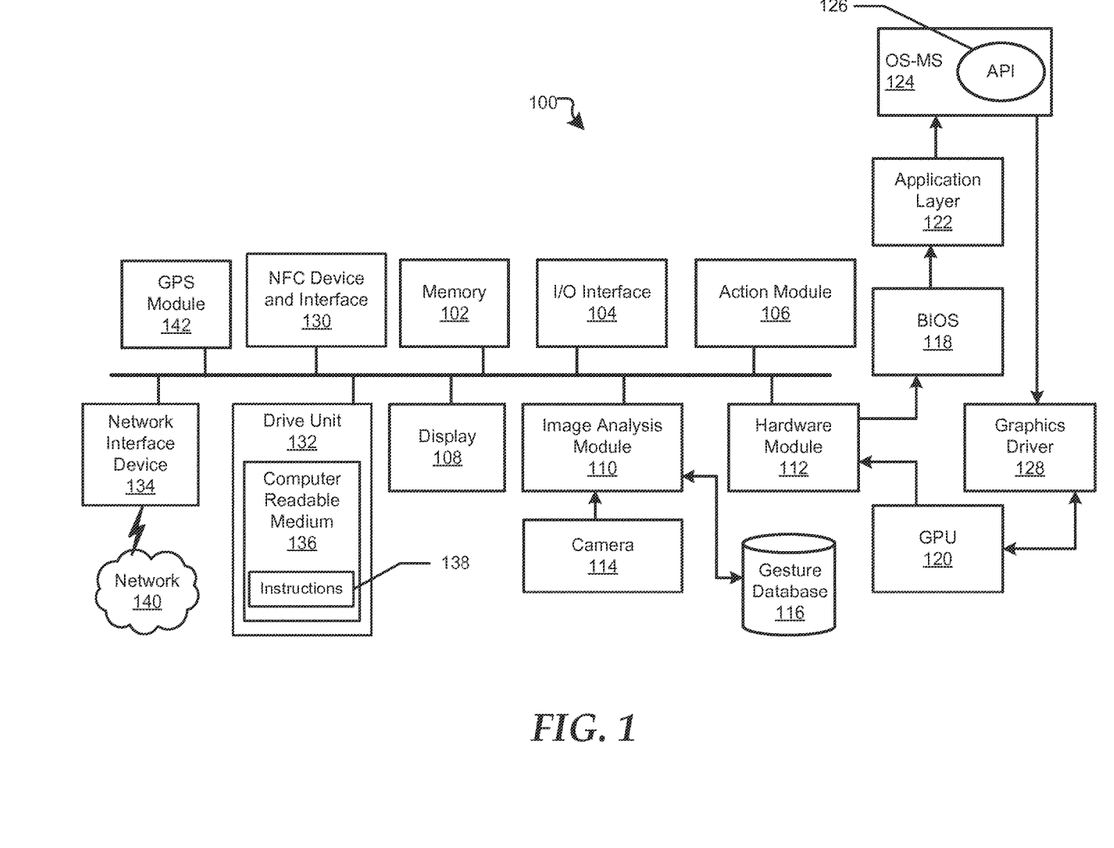
FIG. 1 is a block diagram of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a memory 102, an input/output (1/O) interface 104, an action module 106, a display 108, an image analysis module 110, and a hardware module or processor 112. The information handling system 100 also includes a camera 114, a gesture database 116, a basic input/output system (BIOS) 118, and a graphics processor unit (GPU) 120. The BIOS 118 can communicate with the GPU 120 via an application layer 122, an operating system-management system module 124, which includes an application programming interface (API) 126, and a graphics driver 128.

The information handling system 100 can also includes near-field communications (NFC) device and interface 130, such as an antenna and NFC subsystem, a disk drive unit 132, and a network interface device 134. In an embodiment, the display 108 can be a liquid crystal display (LCD), an organic light emitting diode (OLED), a flat panel display, a solid state display, a cathode ray tube (CRT), or the like. The display 108 may also act as an input accepting touchscreen inputs. Additionally, the information handling system 100 may include an input device, such as a keyboard 202 shown in FIG. 2, or a cursor control device, such as a mouse or touch pad 204 shown in FIG. 2. The information handling system 100 can represent a device capable of telecommunications, voice communications, and data communications and whose can be share resources among multiple devices. The information handling system 100 can also represent a server device whose resources can be shared by multiple client devices, or it can represent an individual client device, such as a laptop or tablet personal computer.

The information handling system 100 can include a set of instructions that can be executed to cause the computer system to perform any one or more of the methods or computer based functions disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 132 may include a computer-readable medium 136 in which one or more sets of instructions 138 such as software can be embedded. The disk drive unit 132 also contains space for data storage. Further, the instructions 138 may embody one or more of the methods or logic as described herein. In a particular embodiment, the instructions 138 may reside completely, or at least partially, within the main memory 102, and/or within the processor 112 during execution by the information handling system 100. The main memory 102 and the processor 112 also may include computer-readable media. The network interface device 134 can provide connectivity to a network 140, e.g., a wide area network (WAN), a local area network (LAN), wireless network (IEEE 802), or other network. The network interface 134 may also interface with macrocellular networks including wireless telecommunications networks such as those characterized as 2G, 3G, or 4G or similar wireless telecommunications networks similar to those described above.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 138 or receives and executes instructions 138 responsive to a propagated signal; so that a device connected to a network 140 can communicate voice, video or data over the network. Further, the instructions 138 may be transmitted or received over the network 140 via the network interface device 134. In a particular embodiment, BIOS/FW code 136 reside in memory 102, and include machine-executable code that is executed by processor 112 to perform various functions of information handling system 100.

Information handling system 100 includes one or more application programs 138, and BIOS and Firmware (BIOS/FW) code 136. BIOS/FW code 136 includes functions to initialize information handling system 100 on power up, to launch an operating system, and to manage input and output interactions between the operating system and the other elements of information handling system 100.

In another embodiment (not illustrated), application programs and BIOS/FW code reside in another storage medium of information handling system 100. For example, application programs and BIOS/FW code can reside in drive 132, in a ROM (not illustrated) associated with information handling system 100, in an option-ROM (not illustrated) associated with various devices of information handling system 100, in a storage system (not illustrated) associated with network 140, in another storage medium of information handling system 100, or a combination thereof. Application programs 138 and BIOS/FW code 136 can each be implemented as single programs, or as separate programs carrying out the various features as described herein.

The execution of the information handling system 100 to control different application operations will be discussed with respect to FIGS. 1-3. Referring now to FIG. 1, upon the information handling system 100 being powered up, the camera 114 can be initialized. In an embodiment, the camera 114 can be a two-dimensional camera, a three-dimensional camera, a fisheye camera, or the like. When the camera 114 is initialized, the image analysis module 110 can determine a field of view of the camera, such as the field of view 206 shown in FIG. 2, based on raw image data received from the camera. For example, the image analysis module 110 can determine that there is a narrow field of view, a wide field of view, or the like. In an embodiment, the field of view 206 can be defined as a narrow field of view in response to the information handling system 100 being located in a public place, such as an airplane, a coffee shop, or the like. The field of view 206 can be defined as a wide field of view in response to the information handling system 100 being located in a private location, such as an office, an individual's home, or the like.

The image analysis module 110 can provide the field of view 206 to the action module 106, which in turn can utilize the field of view to determine the location of the information handling system 100. The action module 106 can also based the location of the information handling system 100 on data received from a global positioning system (GPS) module 142 of the information handling system. In an embodiment, different locations for the information handling system 100, such as an office, coffee shop, home, or the like, can be stored in the memory 102 based on previous location determinations made by the action module 106. These locations can each be stored in the memory 102 and associated with data received from the GPS module 142. Thus, the action module 106 can access the data stored in memory 102 to determine whether the data received from the GPS module 142 is associated with stored known location.

The action module 106 can then select a preset group of movements and/or gestures to utilize as control inputs for operations to be performed by the information handling system 100 based on the location of the information handling system. In an embodiment, the image analysis module 110 can also determine different characteristics about the individual using the information handling system 110, such as age based on appearance of the individual's face and hair, size based on the individual's palm size, or the like. The image analysis module 110 can determine these characteristics based on the raw image data received from the camera 114. The individual's characteristics can affect the ergonomics of particular gestures for the individual. For example, a large movement can be less ergonomic to older and/or smaller individuals as compared to younger and larger individuals because larger movements can cause more strain on the individual than smaller movements. The action module 106 can utilize information about the individual's characteristics along with the location of the information handling system 100 to select a preset group of movements. In an embodiment, the preset movements can be either large or small movements based on the location of the information handling system 100 and based on characteristics of the individual. For example, if the information handling system 100 is located in a private location, such as an office, and the individual is young and tall the preset movements can be large movements.

Figure 2:
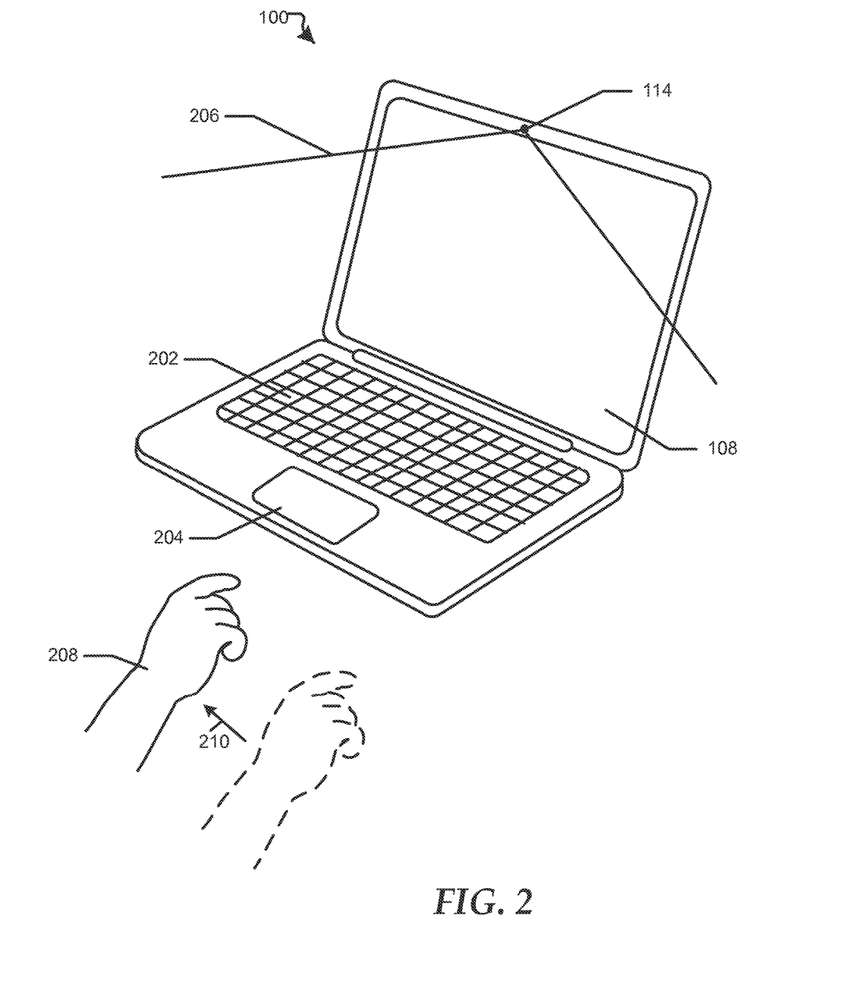
FIG. 2 is a diagram of the information handling system with a gesture providing a function.
Figure 3:
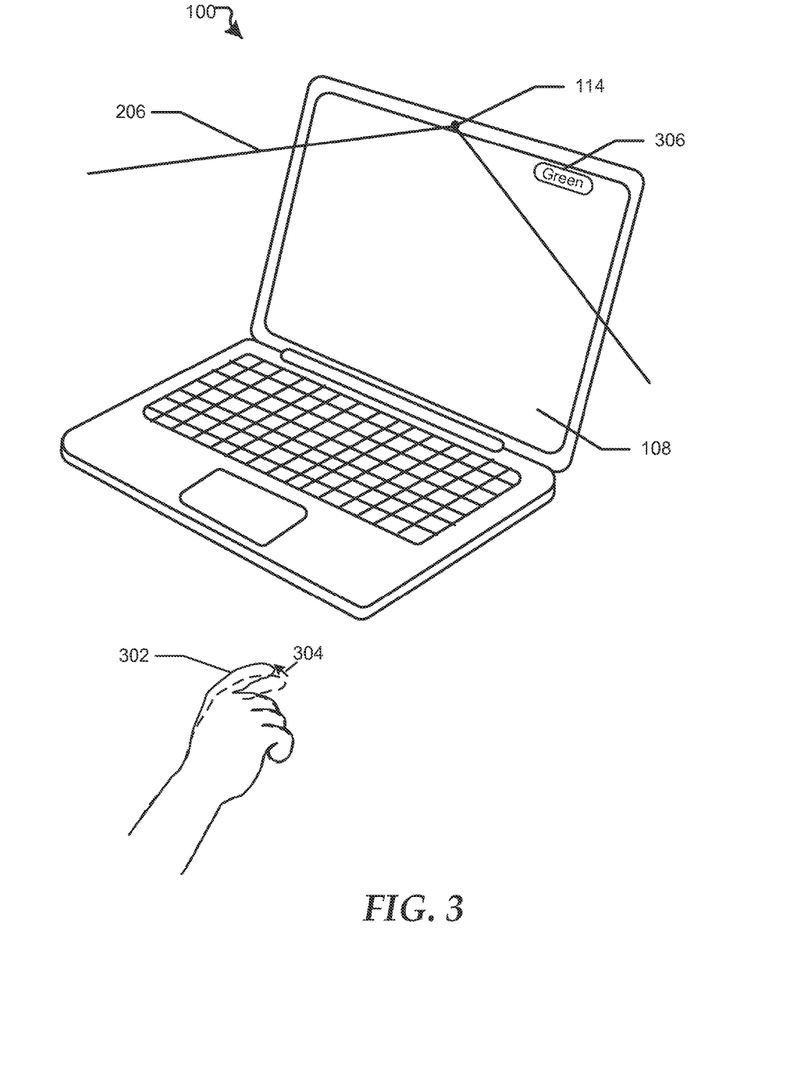
FIG. 3 is another diagram of the information handling system with another gesture providing the function.

Referring now to FIG. 2, a large movement can be moving an individual's entire hand 208 horizontally within the field of view 206 in the direction of arrow 210. Additionally, a large movement can be moving the hand 208 vertically in the field of view 206 or the like. Referring now to FIG. 3, a small movement can be moving a finger 302 horizontally in the field of view 206 in the direction of arrow 304, moving the finger vertically, tapping the finger on a surface, or the like.

Referring back to FIG. 1, the movements can be defined as control inputs to cause the hardware module 112 to perform different operations, such as scroll, swipe, or click (enter), in an application executing in the information handling system 100. In an embodiment, some movements or gestures can be pre-defined as control inputs for operations in the information handling system 100. Thus, the action module 106 can compare the movement received from the image analysis module 110 to movements stored in the memory 102, and determine whether the movement matches a stored movement and thereby can be easily mapped to an operation. However, if the detected movement does not match a stored movement, the action module 106 can predict an operation for the detected movement. The action module 106 can then provide a notification of the predicted operation to the individual via a message on the display 108. If the predicted operation is correct, the individual can confirm the operation and the action module 106 can then store the movement along with the associated operation in the memory 102 so that the movement can be easily matched to an operation the next time that movement is detected.

The action module 106 can then provide the desired operation to the hardware module 112, which in turn can communicate with the graphics driver 128 and the GPU 120 via BIOS 118, the application layer 122, and the API 126 of the OS-MS module 124 to perform the desired operation and update a graphical representation of an application on the display 108.

The action module 106 can track a gesture comfort level, which can change based on a number of times that the movement or gesture is performed, based on a range of movement for the gesture, or the like. In an embodiment, the gesture comfort level can be one of three different levels, and the current gesture comfort can be displayed using an icon 306 on the display screen 108 as shown in FIG. 3. For example, the lowest level for the gesture comfort level can be displayed by a green colored bar on the display screen, the mid-level for the gesture comfort level can be displayed by a yellow colored bar on the display screen, and the highest level for the gesture comfort level can be displayed by a red colored bar on the display screen. The gesture comfort level displayed as icon 306 can provide the individual with a visual feedback as to possible strain the movement is providing to the individual, so that the individual can determine whether to change the movement.

If the gesture comfort level icon 306 turns red or if the individual knows that the movement will be performed multiple times in a row, the individual can perform a movement or gesture, such a making a looping motion, to cause the action module 106 to change from detecting large movements to detecting small movements. The small movements can be more ergonomic for the individual and thereby provide less strain on the individual's body. When the action module 106 changes to detecting small movements, the action module can distinguish between the movement of one finger and the movement of two fingers. The action module 106 can also cause the hardware module 112 to perform different operations in response to the different movements. For example, the action module 106 can cause the hardware module 112 to scroll within an application in response to detecting only one finger moving, and the action module can cause the hardware module to click a soft button or other selectable graphical representation on the display 108 in response to detecting two fingers moving.

In an embodiment, the action module 106 can include two microphones that can be utilized to detect auditory inputs. For example, the microphones can detect a tapping, and based on the speed of the tapping the action module 106 can cause different operations to be performed. In an embodiment, when the action module 106 detects a slow tapping, the action module can cause the hardware module 112 to perform a scrolling operation. When the action module 106 detects a fast tapping, the action module can cause the hardware module 112 to perform a click or enter operation. Thus, the action module 106 can utilize the location of the information handling system 100 and the ergonomic effect of different movements on an individual to determine the type of movement to detect. The action module 106 can also receive auditory inputs, and can map both the movement and auditory inputs to different operations to be executed by the hardware module 112.

Figure 4:
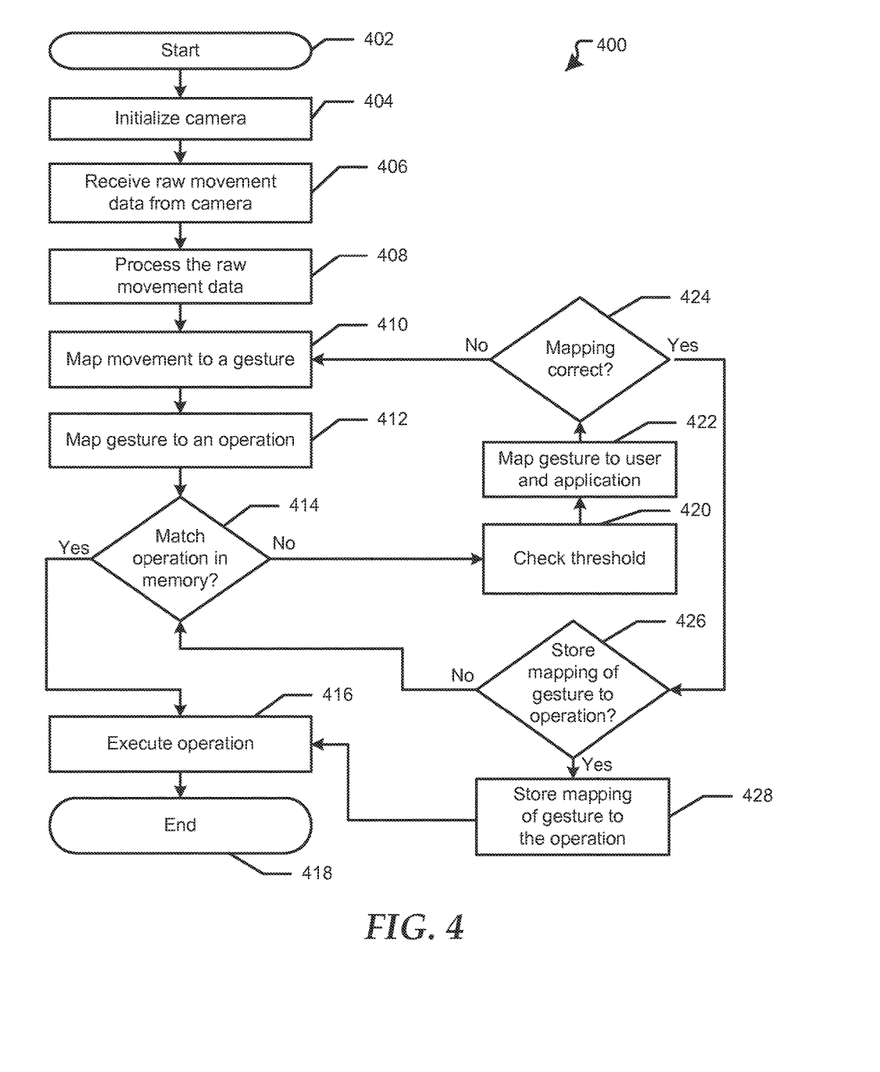
FIG. 4 is a flow diagram of a method for determining an operation to execute in response to a detected movement.

FIG. 4 shows a flow diagram of a method 400 for determining an operation to execute in response to a detected movement. The flow starts at block 402, and then the flow proceeds to block 404 where a camera of an information handling system is initialized. In an embodiment, the camera can be a two-dimensional camera, a three-dimensional camera, a fisheye camera, or the like. At block 406, raw movement data is received from the camera. The flow then proceeds to block 408 and the raw movement that is processed. At block 410, the movement is mapped to a gesture. In an embodiment, the gesture can be the same as above.

The gesture is then mapped to an operation within an application of the information handling system at block 412. At block 414, a determination is made whether the mapped operation matches an operation found in a memory of the information handling system. If the mapped operation does not match a stored operation the flow continues at block 420, otherwise, the flow continues at block 416 and that operation is executed by the information handling system. In an embodiment, the operation can be to scroll, swipe between pages, click, or the like in an application executed in the information handling system. The flow then ends at block 418.

At block 420, a threshold of the movement is checked. In an embodiment, the threshold can be the length of the movement. For example, the movement can exceed the threshold in response to an individual moving his or her entire hand. However, the movement may not exceed the threshold in response to the individual only moving his or her finger. At block 422, the gesture is then map to an individual and an application executing in the information handling system based on whether the movement exceeds the threshold. In an embodiment, an individual moving only his or her can be mapped to a swipe operation in response to the movement not exceeding the threshold at block 420. At block 424, a determination is made whether the mapping to the application is correct. In an embodiment, a message prompting an individual to determine whether the mapped gesture is correct. In an embodiment, the gesture can be mapped to scrolling, swiping, clicking, or the like in an application.

If the response from individual is that the gesture does not correspond to the identified operation, the flow continues as described above at block 410. Otherwise, the flow continues at block 426 and a determination is made whether to store the mapped gesture to an operation. If the gesture is not to be stored in a memory the flow continues as stated above at block 414, otherwise the flow proceeds to block 428 and the mapping of the gesture to the operation is stored in the memory of the information handling system. The flow then continues as described above at block 416.

Figure 5:
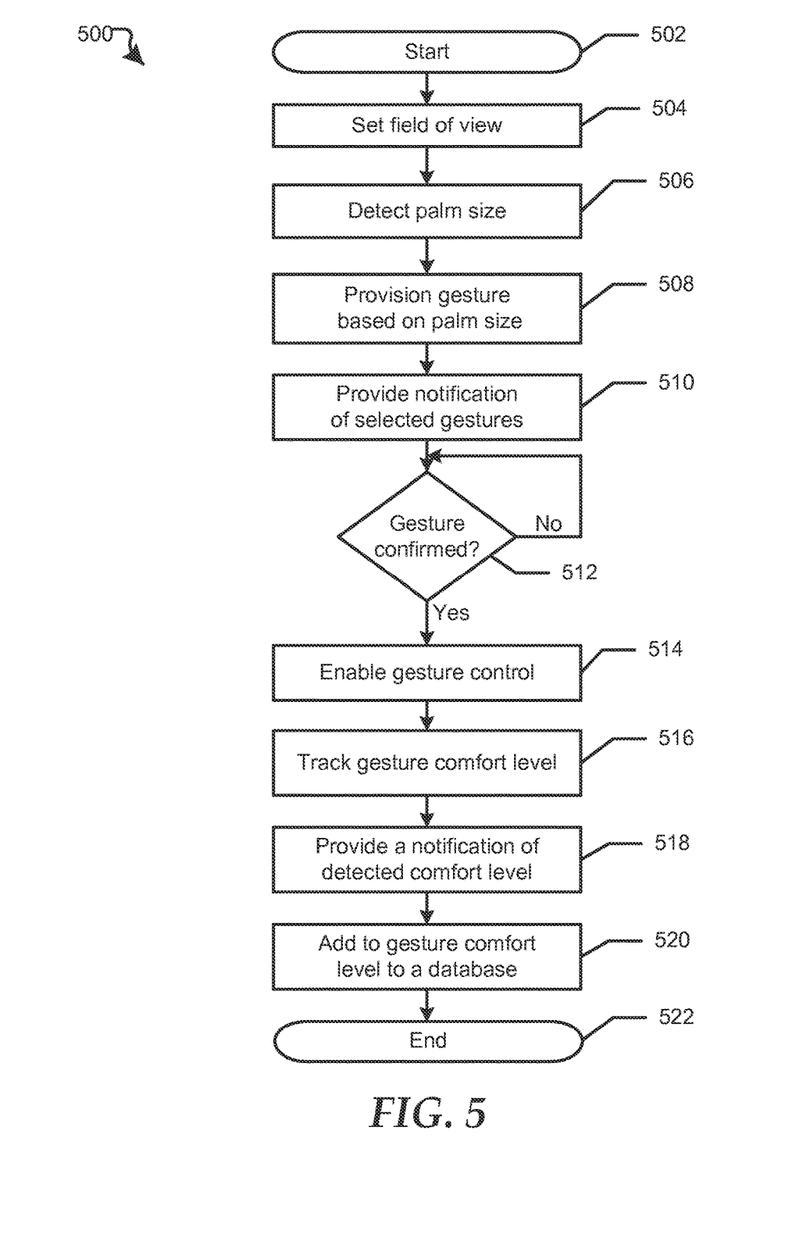
FIG. 5 is a flow diagram of a method for tracking movements as gestures.

FIG. 5 shows a flow diagram of a method 500 for tracking movements as gestures in an information handling system. The flow diagram starts at block 502, and a field of view for a camera of an information handling system at block 504. The flow then proceeds to block 506 and a palm size of a user of the information handling system. At block 508, gestures are provisioned based on the detected palm size. In an embodiment, the provisioned gesture can be that large movements, such as an entire hand moving horizontally within the field of view, are detect a gestures in the information handling system. In an embodiment, the gestures can be based on both the detected palm size and the field of view. The flow proceeds to block 510 and a notification of the selected gestures is provided. In an embodiment, the notification can be a message displayed on a display screen of the information handling system indicating that the gestures are based on large movements, or that the gestures are based on small movements.

At block 512, a determination is made whether the selected gestures are confirmed. In an embodiment, the selected gestures are confirmed in response to a soft button of the message on the display screen being selected. When the selected gestures are confirmed, the flow proceeds to block 514 and gesture control is enabled for applications executing on the information handling system. At block 516, a gesture comfort level is tracked. In an embodiment, the gesture comfort can be based on a number of times that the movement for the gesture is performed, the range of movement for the gesture, or the like. A notification is provided to indicate the tracked gesture comfort level at block 518.

In an embodiment, the tracked gesture comfort level can be three different levels that are displayed using an icon on the display screen of the information handling system. For example, the lowest level for the gesture comfort level can be displayed by a green colored bar on the display screen, the mid-level for the gesture comfort level can be displayed by a yellow colored bar on the display screen, and the highest level for the gesture comfort level can be displayed by a red colored bar on the display screen. At block 520, the determined gesture comfort level for that particular gesture is added to a database, and the flow ends at block 522.

Figure 6:
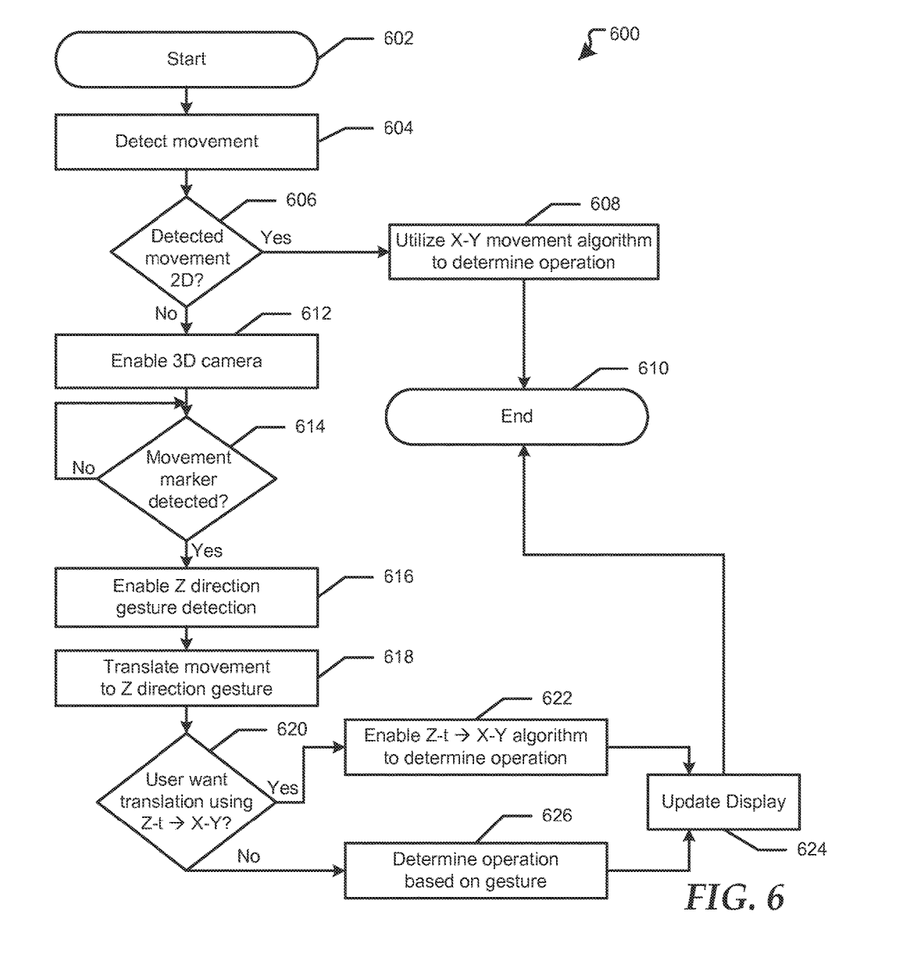
FIG. 6 is a flow diagram of a method for switching between movement sizes for gestures.

FIG. 6 shows a flow diagram of a method 600 for switching between movement sizes and orientations for corresponding gestures. The flow starts at block 602, and proceeds to block 604 where a movement is detected. In an embodiment, the movement can be moving a hand horizontally, moving a finger horizontally, moving the hand horizontally, moving the finger vertically, moving the finger toward a camera of an information handling system in a flicking motion, tapping the finger on a surface, or the like. At block 606, a determination is made whether the detected movement is a two-dimensional movement. For example, the detected movement is a two-dimensional movement if the movement was in either an X or Y direction of the field of view of the camera.

In an embodiment, the movement can be in the X direction if the movement was substantially horizontal, such as a movement left to right or right to left, in the field of view of the camera. In an embodiment, the detected movement can be in the Y direction if the movement is substantially vertical, such as an up to down or down to up movement, in the field of view of the camera. If the detected movement is not a two-dimensional movement the flow continues at block 612, otherwise the flow continues at block 608. At block 608, an X-Y movement algorithm is utilized to determine an operation to be performed by the information handling system, and the flow ends at block 610.

At block 612, a three-dimensional camera is enabled. At block 614, a determination is made whether a movement marker is detected. In an embodiment, the movement marker can be a threshold distance of a movement in any direction. When a movement marker is detected the flow continues at block 616 where Z direction gesture detection is enabled. In an embodiment, a Z direction movement can be a movement of a hand and or finger toward or away from the camera of the information handling system. At block 618, a detected movement is translated into a Z direction gesture. In an embodiment, the Z movement can be associated with different gestures based on the speed of the movement. For example, a slow tapping movement can be associated with a select operation, and a fast tapping movement can be associated with a enter operation. A threshold level for the speed of the movement can be pre-set in the information handling system, can be determined by the information handling system based on individual actions, or the like. At block 620, a determination is made whether the individual wants to translate the gesture into a corresponding operation mapping the Z movement using the X-Y algorithm.

If the user does not want to map the Z movement using the X-Y algorithm, the flow continues at block 626, otherwise the X-Y algorithm is enabled and used to determine operation based on the Z movement at block 622. In an embodiment, the operation can be to scroll, swipe, or click within an application executed in the information handling system. At block 624, the display of the information handling system is updated based on the operation executed in response to the gesture, and the flow ends at 610. At block 626, the operation is determined based on the received gesture and the flow continues as described above at block 624.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   initializing a camera on an information handling system;
   automatically adjusting, via a processor executing code instructions, between detecting larger gesture movements or smaller gesture movements within a field of view for the camera to accommodate ergonomics for an individual based on surroundings of the individual and the palm size of the individual detected in the field of view in front of the camera;
   detecting the palm size of the individual;
   selecting a set of gestures requiring either larger gesture movements or smaller gesture movements from a gesture database having a plurality of sets of gestures based on the detected palm size of the individual and the surroundings of the individual detected from the field of view, wherein the set of gestures requiring larger gesture movements are larger motions relative to the set of gestures requiring smaller gesture movements;
   tracking a gesture comfort level for the individual based on number of times a detected gesture is performed and the range of movement indicating the size of the gesture movement relative to the selected set of gestures; and notifying the individual of the tracked gesture comfort level, wherein a plurality of gesture comfort levels may be indicated depending on the tracking.

2. The method of claim 1, further comprising:
notifying the individual of the selected gestures; and
receiving a confirmation, via a user input, of selected gestures.

3. The method of claim 2, wherein notifying the individual comprises:
displaying, via a display screen, a message indicating a size of gesture on a display screen of the information handling system.

4. The method of claim 1, wherein tracking the gesture comfort level comprises:
determining a number of times that a gesture is detected;
detecting a range of motion associated with the gesture; and
determining that the gesture comfort level is within one of a plurality of comfort levels.

5. The method of claim 1, wherein the selected set of gestures are associated with a determined size of movement required to perform a gesture within the field of view.

6. The method of claim 5, wherein the determined size of movement is selected from a group consisting of moving a hand horizontally, moving a finger horizontally, moving the hand horizontally, moving the finger vertically, tapping the finger on a surface.

7. The method of claim 1, wherein the field of view is selected from a group consisting of a wide field of view and a narrow field of view.

8. The method of claim 1, wherein the gesture is associated with an operation to be performed during execution of an application running on the information handling system.

9. The method of claim 8, wherein the operation of the information handling system associated with the gesture is selected from a group including swipe, scroll, and click.

10. An information handling system comprising:
a memory to store a mapping of a plurality of gestures to a plurality of operations to be performed in the information handling system;
a camera to detect a field of view and a processor to automatically adjust between sets of gestures associated with detecting larger gesture movements or smaller gesture movements within the field of view to accommodate ergonomics for an individual based on surroundings of the individual detected in the field of view in front of the camera, and the camera to capture a movement made by the individual within the field of view, wherein the set of gestures associated with detecting larger gesture movements are larger motions relative to the set of gestures associated with detecting smaller gesture movements;
an image analysis module to receive movement data from the camera, and to determine a gesture from the set of gestures associated with the movement based on the adjustment to either larger gesture movements or smaller gesture movements within the field of view; and
an action module configured to communicate with the image analysis module, and to map the determined gesture to an operation of the information handling system based on the mapping of the gestures to the operations stored in the memory.

11. The information handling system of claim 10, wherein the plurality of gestures include moving a hand horizontally, moving a finger horizontally, moving the hand horizontally, moving the finger vertically, tapping the finger on a surface.

12. The information handling system of claim 10, wherein the field of view changes based on a location of the information handling system.

13. The information handling system of claim 10, further comprising:
a global positioning system module to identify the location of the information handling system.

14. The information handling system of claim 10, wherein the camera is a three dimensional camera, and the camera is utilized to determine the location of the information handling system.

15. A method comprising:
initializing a camera on an information handling system;
determining, via a processor executing code instructions of an image analysis module, a field of view for the camera and automatically adjusting between a set of gestures requiring a first size of gesture movement and a set of gestures requiring a second size of gesture movement based on surroundings of an individual detected in the field of view in front of the camera;
detecting a palm size of the individual;
selecting a set of gestures from a gesture database based on the palm size of the individual and adjusted field of view, wherein the selected set of gestures are associated with the first size movements required to perform the gesture within the field of view; and
detecting an additional gesture indicating to change the selected gestures to a different set of gestures, wherein the different set of gestures are associated with the second size of gesture movements required to perform the gesture, wherein the set of gestures associated with the first size movements are larger motions relative to the set of gestures associated with second size of gesture movements.

16. The method of claim 15, further comprising:
tracking a gesture comfort level for the individual; and
notifying the individual of the gesture comfort level.

17. The method of claim 15, further comprising:
notifying the individual of the selected gestures; and
receiving a confirmation of selected gestures.

18. The method of claim 17, wherein notifying the individual comprises:
displaying, via a display screen, a message indicating a size of gesture on a display screen of the information handling system.

19. The method of claim 15, wherein tracking the gesture comfort level comprises:
determining a number of times that a gesture is detected;
detecting a range of motion associated with the gesture; and
determining that the gesture comfort level is within one of a plurality of comfort levels.

20. The method of claim 15, wherein the determined size of movement required to perform a gesture within the field of view is selected from a group consisting of moving a hand horizontally, moving a finger horizontally, moving the hand horizontally, moving the finger vertically, tapping the finger on a surface.

* * * * *